(12) United States Patent
Lee et al.

(10) Patent No.: US 9,653,210 B2
(45) Date of Patent: May 16, 2017

(54) MULTILAYER CERAMIC CAPACITOR (71) Applicant: SAMSUNG ELECTRO-MECHANICS CO., LTD., Suwon-si, Gyeonggi-do (KR)

(72) Inventors: Byoung Hwa Lee, Suwon-si (KR); Young Key Kim, Suwon-si (KR); Min Cheol Park, Suwon-si (KR); Young Ghyu Ahn, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 115 days.

(21) Appl. No.: 14/558,717

(22) Filed: Dec. 2, 2014

(65) Prior Publication Data
US 2015/0325370 A1 Nov. 12, 2015

(30) Foreign Application Priority Data
May 7, 2014 (KR) .................. 10-2014-0054245

(51) Int. Cl.
| | |
|---|---|
| *H01G 4/30* | (2006.01) |
| *H01G 2/14* | (2006.01) |
| *H01G 2/16* | (2006.01) |
| *H01G 4/12* | (2006.01) |
| *H01G 4/012* | (2006.01) |
| *H01G 4/008* | (2006.01) |
| *H01G 4/232* | (2006.01) |

(52) U.S. Cl.
CPC .............. *H01G 2/14* (2013.01); *H01G 2/16* (2013.01); *H01G 4/008* (2013.01); *H01G 4/012* (2013.01); *H01G 4/1227* (2013.01); *H01G 4/232* (2013.01); *H01G 4/30* (2013.01)

(58) Field of Classification Search
CPC ................................... H01G 4/30; H01G 4/06
See application file for complete search history.

(56) References Cited

U.S. PATENT DOCUMENTS

| 7,164,573 B1 | 1/2007 | Prymak | |
|---|---|---|---|
| 2009/0244803 A1* | 10/2009 | Lee | ........................ H01G 4/012 361/301.4 |

(Continued)

FOREIGN PATENT DOCUMENTS

| JP | 2013-502746 A | 1/2013 |
|---|---|---|
| WO | 2011/028551 A2 | 3/2011 |

Primary Examiner — Nguyen Ha
(74) Attorney, Agent, or Firm — McDermott Will & Emery LLP (57) ABSTRACT A multilayer ceramic capacitor may include: a ceramic body; a plurality of first internal electrodes disposed in the ceramic body; a plurality of second internal electrodes stacked alternately with the first internal electrodes in the ceramic body; first and second external electrodes connected to the first internal electrodes, respectively; a third external electrode extended from one side surface of the ceramic body to a portion of a surface opposing a mounting surface of the ceramic body and connected to the second internal electrodes; a fourth external electrode extended from the other side surface of the ceramic body to a portion of the surface opposing the mounting surface of the ceramic body; and an intermitting part disposed on the surface opposing the mounting surface of the ceramic body and connecting the third and fourth external electrodes to each other.

10 Claims, 4 Drawing Sheets (56) References Cited

U.S. PATENT DOCUMENTS

| | | | | |
|---|---|---|---|---|
| 2011/0043963 A1* | 2/2011 | Bultitude | ................ | H01G 2/16 361/321.4 |
| 2013/0058006 A1* | 3/2013 | Kim | ........................ | H01G 4/12 361/321.2 |
| 2014/0311788 A1* | 10/2014 | Park | ........................ | H01G 4/30 174/260 |

* cited by examiner

MULTILAYER CERAMIC CAPACITOR

CROSS-REFERENCE TO RELATED APPLICATION

This application claims the benefit of Korean Patent Application No. 10-2014-0054245 filed on May 7, 2014, with the Korean Intellectual Property Office, the disclosure of which is incorporated herein by reference.

BACKGROUND

The present disclosure relates to a multilayer ceramic capacitor (MLCC).

A multilayer ceramic capacitor, a multilayer chip electronic component, is a chip type condenser mounted on a board of several electronic products such as image devices, for example, liquid crystal displays (LCD), plasma display panels (PDP), or the like, computers, personal digital assistants (PDA), smartphones, cellular phones, and the like, to serve to charge or discharge electricity therein or therefrom.

The multilayer ceramic capacitor may be used as components of various electronic apparatuses due to advantages such as a small size, a high capacitance an easy mounting feature, and the like.

In the case in which a product having a relatively low equivalent series resistance (ESR) value among the multilayer ceramic capacitors is used in a power supply circuit, there may be a problem in which oscillation occurs in the power supply circuit due to low ESR characteristics.

When an ESR value of a multilayer ceramic capacitor is increased in order to prevent oscillation, an equivalent series inductance (ESL) value is increased, such that electrical characteristics of the multilayer ceramic capacitor may be deteriorated.

In addition, short circuits may occur in the multilayer ceramic capacitor due to internal short circuits or electrical overload.

In this case, an over-current is transferred to remaining circuits connected to the multilayer ceramic capacitor to cause damage to the entirety of a product connected to the multilayer ceramic capacitor.

SUMMARY

Some embodiments in the present disclosure may provide a multilayer ceramic capacitor capable of improving electrical characteristics of a multilayer ceramic capacitor by significantly suppressing an increase in an equivalent series inductance (ESL) value, even while increasing an equivalent series resistance (ESR) value, and capable of preventing an over-current of the multilayer ceramic capacitor from causing damage to the entirety of a product connected to the multilayer ceramic capacitor by opening a circuit in the case in which short circuits occur in the multilayer ceramic capacitor.

According to some embodiments in the present disclosure, a multilayer ceramic capacitor may include: a ceramic body having a plurality of dielectric layers stacked in a thickness direction of the ceramic body; a plurality of first internal electrodes disposed in the ceramic body to be exposed through both end surfaces of the ceramic body with a respective dielectric layer interposed between the first internal electrodes; a plurality of second internal electrodes stacked alternately with the first internal electrodes in the ceramic body and disposed in the ceramic body to be exposed through one side surface of the ceramic body, with a respective dielectric layer interposed between the second internal electrodes; first and second external electrodes disposed on both end surfaces of the ceramic body, respectively, and connected to both end portions of the first internal electrodes, respectively; a third external electrode extended from one side surface of the ceramic body to a portion of a surface opposing a mounting surface of the ceramic body and connected to the second internal electrodes; a fourth external electrode extended from the other side surface of the ceramic body to a portion of the surface opposing the mounting surface of the ceramic body; and an intermitting part disposed on the surface opposing the mounting surface of the ceramic body and connecting the third and fourth external electrodes to each other.

The second internal electrode may have a lead-out portion to be exposed through one side surface of the ceramic body.

The first and second external electrodes may be extended from both end surfaces of the ceramic body to portions of the mounting surface of the ceramic body, respectively.

According to some embodiments in the present disclosure, a multilayer ceramic capacitor may include: a ceramic body having a plurality of dielectric layers stacked in a width direction of the ceramic body; first and second external electrodes disposed on a mounting surface of the ceramic body to be spaced apart from each other in a length direction of the ceramic body; a third external electrode disposed on the mounting surface of the ceramic body and disposed between the first and second external electrodes; fourth to sixth external electrodes disposed on a surface opposing the mounting surface of the ceramic body to correspond to the first to third external electrodes, respectively; a plurality of first and second internal electrodes alternately disposed in the ceramic body with a respective dielectric layer interposed between the plurality of first and second internal electrodes; first and second lead-out portions extended from the first internal electrode to be exposed through the mounting surface of the ceramic body and the surface opposing the mounting surface of the ceramic body, respectively, and connected to the first and fourth external electrodes, respectively; third and fourth lead-out portions extended from the second internal electrode to be exposed through the mounting surface of the ceramic body and the surface opposing the mounting surface of the ceramic body, respectively, and connected to the third and sixth external electrodes, respectively; and an intermitting part disposed on the surface opposing the mounting surface of the ceramic body and connecting the fifth and sixth external electrodes to each other.

The first or second internal electrode may be spaced apart from both end surfaces of the ceramic body.

The first to sixth external electrodes may be extended from the mounting surface of the ceramic body or the surface opposing the mounting surface of the ceramic body to portions of both side surfaces of the ceramic body, respectively.

The intermitting part may be a fuse or a resistive pattern.

BRIEF DESCRIPTION OF DRAWINGS

The above and other aspects, features and other advantages will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A direction of a hexahedron will be defined in order to clearly describe exemplary embodiments in the present disclosure. L, W and T shown in the accompanying drawings refer to a length direction, a width direction, and a thickness direction, respectively.

Horizontal Mounting Type Multilayer Ceramic Capacitor

Figure 1:
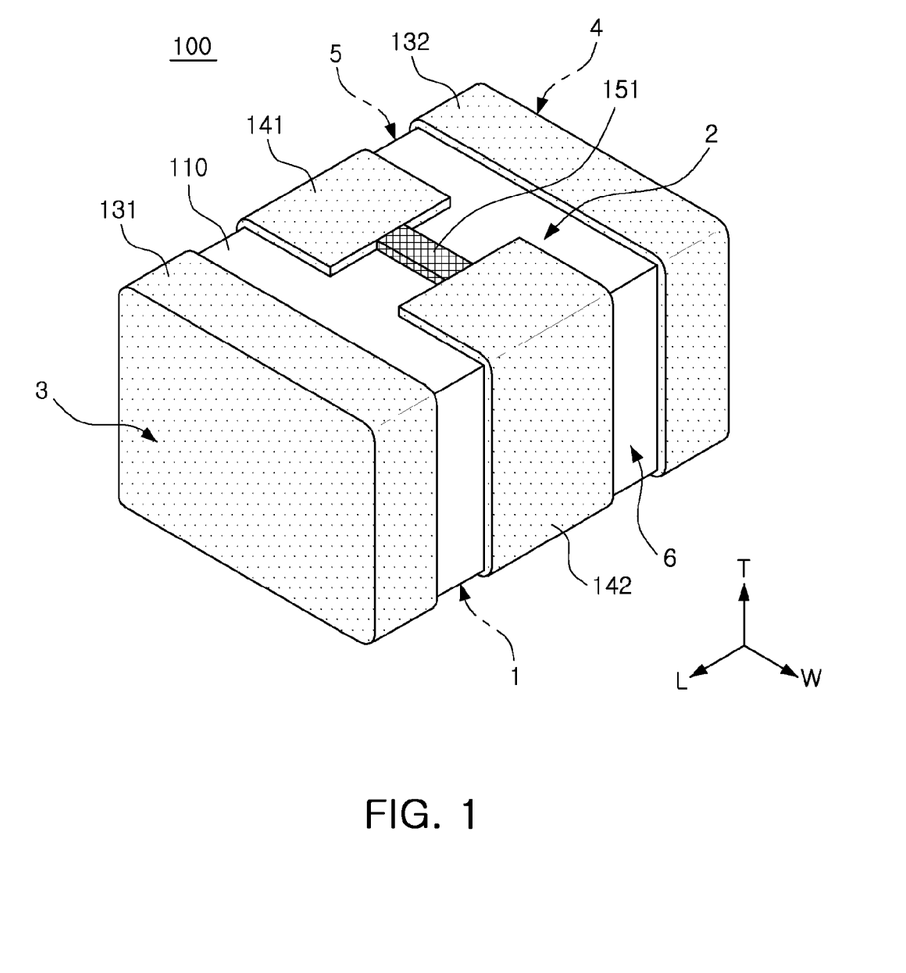
FIG. 1 is a perspective view schematically illustrating a multilayer ceramic capacitor according to an embodiment in the present disclosure.
Figure 2:
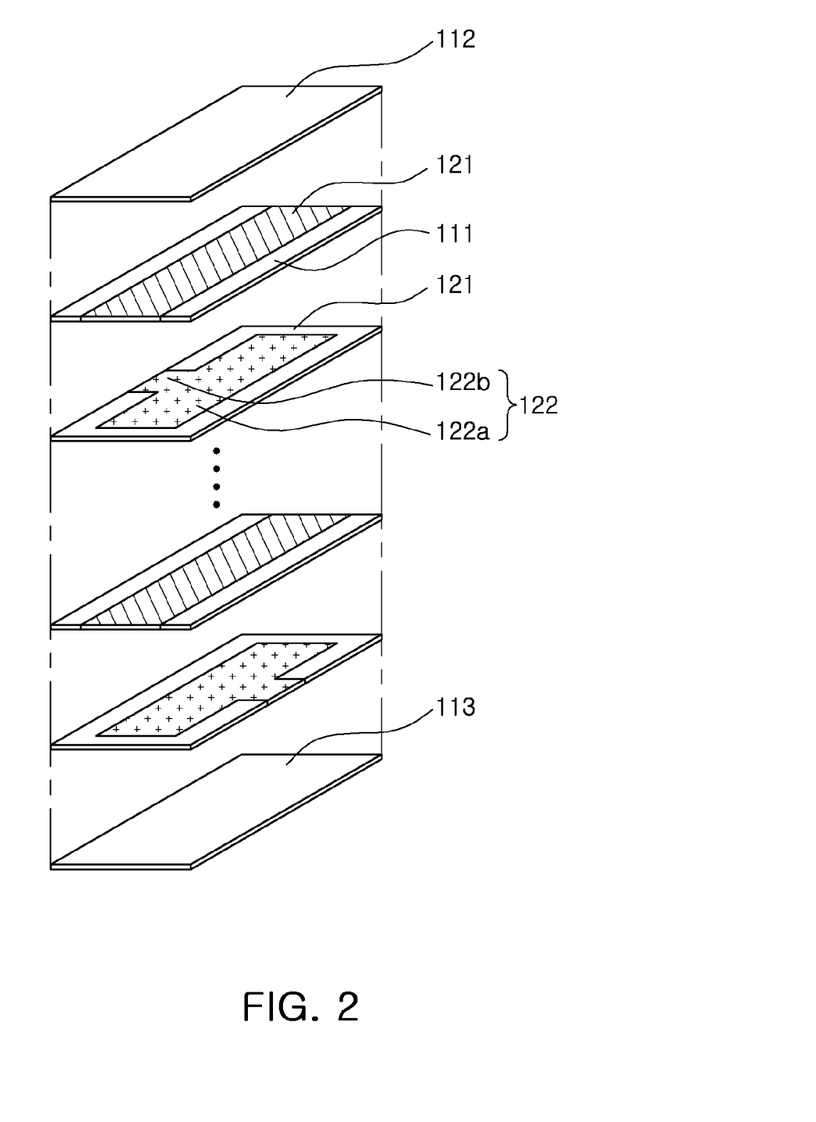
FIG. 2 is an exploded perspective view illustrating a structure in which first and second internal electrodes of the multilayer ceramic capacitor of FIG. 1 are stacked.

FIG. 1 is a perspective view schematically illustrating a multilayer ceramic capacitor according to an embodiment in the present disclosure; and FIG. 2 is an exploded perspective view illustrating a structure in which first and second internal electrodes of the multilayer ceramic capacitor of FIG. 1 are stacked on each other.

Referring to FIGS. 1 and 2, a multilayer ceramic capacitor 100 according to an embodiment in the present disclosure may include a ceramic body 110, a plurality of first and second internal electrodes 121 and 122, first and second external electrodes 131 and 132 disposed on both end surfaces of the ceramic body 100, respectively, third and fourth external electrodes 141 and 142 disposed on both side surfaces of the ceramic body 110, respectively, and an intermitting part 151 disposed on a surface opposing a mounting surface of the ceramic body 110.

For example, the multilayer ceramic capacitor 100 according to an embodiment in the present disclosure may be a four-terminal capacitor having a total of four external electrodes.

The ceramic body 110 may be formed by stacking a plurality of dielectric layers 111 in a thickness direction and then sintering the plurality of dielectric layers 111 to 113.

However, a shape and a dimension of the ceramic body 110 according to the present disclosure and the number of stacked dielectric layers 111 are not limited to those according to the embodiment in the present disclosure shown in FIGS. 1 and 2.

Here, the plurality of dielectric layers 111 forming the ceramic body 110 may be in a sintered state.

Therefore, adjacent dielectric layers 111 may be integrated with each other so that boundaries therebetween are not readily apparent without a scanning electron microscope (SEM).

The ceramic body 110 may have a hexahedral shape.

According to an embodiment in the present disclosure, first and second main surfaces 1 and 2 refer to surfaces of the ceramic body 110 opposing each other in a thickness direction, first and second end surfaces 3 and 4 refer to surfaces of the ceramic body 110 connecting the first and second main surfaces 1 and 2 to each other and opposing each other in a length direction of the ceramic body, and first and second side surfaces 5 and 6 refer to surfaces of the ceramic body 110 opposing each other in a width direction thereof.

Hereinafter, according to the embodiment in the present disclosure, a description will be provided under the assumption that the mounting surface of the multilayer ceramic capacitor 100 is the first main surface 1 of the ceramic body 110.

The ceramic body 110 may include an active layer and cover layers 112 and 113.

The active layer, which contributes to forming a capacitance of the multilayer ceramic capacitor, may be a part in which the plurality of internal electrodes are stacked in the ceramic body 110.

The cover layers 112 and 113, disposed on portions of the active layer corresponding to the first and second main surfaces 1 and 2 of the ceramic body 110, may be formed using the same material as that of the dielectric layer 111 of the active layer and have the same configuration as that of the dielectric layer 111 of the active layer except that they do not include the internal electrodes.

In addition, the cover layers 112 and 113 may be formed by stacking a single dielectric layer or two or more dielectric layers on the portions of the active layer corresponding to the first and second main surfaces 1 and 2 of the ceramic body in the thickness direction, respectively.

The cover layers 112 and 113 may serve to prevent the first and second internal electrodes 121 and 122 from being damaged due to physical or chemical stress.

The dielectric layers 111 may contain a high-k ceramic material.

The dielectric layers 111 may contain, for example, barium titanate ($BaTiO_3$) based ceramic powder, or the like. However, the present disclosure is not limited thereto as long as a sufficient capacitance may be obtained therefrom.

In addition, the dielectric layers 111 may further contain ceramic additives, organic solvents, plasticizers, binders, dispersants, and the like, as necessary, in addition to the ceramic material.

Here, examples of the ceramic additive may include various kinds of materials such as a transition metal oxide or carbide, rare earth elements, magnesium (Mg), aluminum (Al), and the like.

The first and second internal electrodes 121 and 122 having different polarities may be alternately disposed in the thickness direction within the ceramic body 110 with each of the dielectric layers 111 interposed therebetween.

Here, the plurality of first and second internal electrodes 121 and 122 may be electrically insulated from each other by the dielectric layer 111 disposed therebetween.

The first and second internal electrodes 121 and 122 may be formed by printing a conductive paste containing a conductive metal on at least one surface of ceramic sheets forming the dielectric layers 111.

The conductive metal contained in the conductive paste may be one of silver (Ag), palladium (Pd), platinum (Pt), nickel (Ni), and copper (Cu), an alloy thereof, or the like. However, the present disclosure is not limited thereto.

In addition, as a method of printing the conductive paste, a screen printing method, a gravure printing method, or the like, may be used. However, the present disclosure is not limited thereto.

The first internal electrodes 121 may be disposed in the ceramic body 110 so as to be simultaneously exposed through the first and second end surfaces 3 and 4 of the ceramic body 110.

The second internal electrodes 122 may be disposed in the ceramic body 110 so as to be exposed through the first side surface 5 of the ceramic body 110.

Here, the second internal electrodes 122 may be exposed through the second side surface 6 of the ceramic body 110, as necessary. In this case, the third external electrode 141 that does not directly contact the second internal electrodes 122 may be provided as a negative electrode.

In addition, the second internal electrode 122 may include a capacitance portion 122a overlapped with the first internal electrode 121 in the thickness direction and forming a capacitance and a lead-out portion 122b extended from the capacitance portion 122a toward the first side surface 5 of the ceramic body 110 so as to be exposed through the first side surface 5 of the ceramic body 110 to thereby be connected to the third external electrode 141.

Here, a capacitance of the multilayer ceramic capacitor 100 may be in proportion to an area of a region in which the first and second internal electrodes 121 and 122 are overlapped with each other in the thickness direction.

The first and second external electrodes 131 and 132, power connection terminals, may be disposed on the first and second end surfaces 3 and 4 of the ceramic body 110, respectively, so as to oppose each other.

Here, the first and second external electrodes 131 and 132 may be extended from the first and second end surfaces 3 and 4 of the ceramic body 110 to portions of the first main surface 1 thereof, which is the mounting surface.

In addition, both end portions of the first internal electrodes 121 exposed through the first and second end surfaces 3 and 4 of the ceramic body 110, respectively, may be electrically connected to the first and second external electrodes 131 and 132, respectively.

The third and fourth external electrodes 141 and 142, which are ground terminals GND, may be disposed on the first and second side surfaces 5 and 6 of the ceramic body 110, respectively, so as to oppose each other and to be spaced apart from the first and second external electrodes 131 and 132.

Here, the third and fourth external electrodes 141 and 142 may be extended from the first and second side surfaces 5 and 6 of the ceramic body 110 to portions of the second main surface 2 thereof, which is the surface opposing the mounting surface.

In addition, the third external electrode 141 may be electrically connected to the lead-out portions 122b of the second internal electrodes 122 exposed through the first side surface 5 of the ceramic body 110.

The first to fourth external electrodes 131, 132, 141, and 142 may be formed using a conductive paste containing a conductive metal.

The conductive metal may be one of nickel (Ni), copper (Cu), and tin (Sn), or an alloy thereof, etc., but is not limited thereto.

The conductive paste may further include an insulating material.

For example, the insulating material may be glass. However, the present disclosure is not limited thereto.

Further, in the present disclosure, a method of forming the first to fourth external electrodes 131, 132, 141, and 142 is not particularly limited. For example, several methods such as a method of forming the first to fourth external electrodes 131, 132, 141, and 142 by dipping the ceramic body 110 in a conductive paste, a method of forming the first to fourth external electrodes 131, 132, 141, and 142 by plating, and the like, may be used.

In addition, a plating layer (not shown) may be formed on the first to fourth external electrodes 131, 132, 141, and 142 by a method such as an electroplating method, or the like.

The plating layer may include a nickel (Ni) plating layer formed on the first to fourth external electrodes 131, 132, 141, and 142 and a tin (Sn) plating layer formed on the nickel plating layer.

The plating layer may be to increase adhesion strength between the multilayer ceramic capacitor 100 and a board when the multilayer ceramic capacitor 100 is mounted on the board, or the like, using soldering.

The intermitting part 151 may be disposed on the second main surface 2, a surface opposing the mounting surface of the ceramic body 110, and may serve to connect the third and fourth external electrodes 141 and 142 to each other on the second main surface 2 of the ceramic body 110.

When a short-circuit phenomenon occurs due to internal short circuits, electrical overload, or the like, the intermitting part 151 may be short-circuited, opening a circuit. Therefore, the intermitting part 151 may prevent an over-current generated in the multilayer ceramic capacitor 100 from being transferred to remaining circuits connected to the multilayer ceramic capacitor 100 so as to prevent damage to the entirety of a product.

Here, the intermitting part 151 may be configured of a fuse, a resistive pattern, or the like. However, the present disclosure is not limited thereto.

Figure 3A:
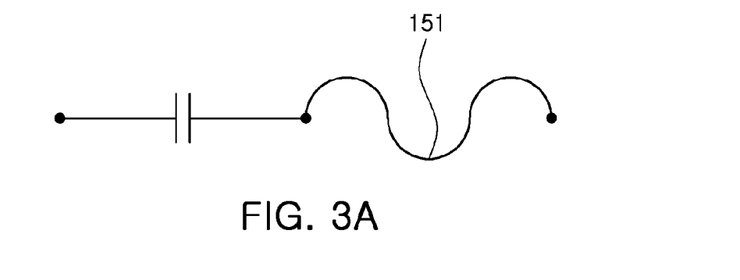
FIGS. 3A and 3B are circuit diagrams illustrating an equivalent circuit of the multilayer ceramic capacitor according to an embodiment in the present disclosure.

With reference to FIG. 3A illustrating an equivalent circuit of the multilayer ceramic capacitor 100 according to an embodiment in the present disclosure, the fuse may be used as the intermitting part 151.

Figure 3B:
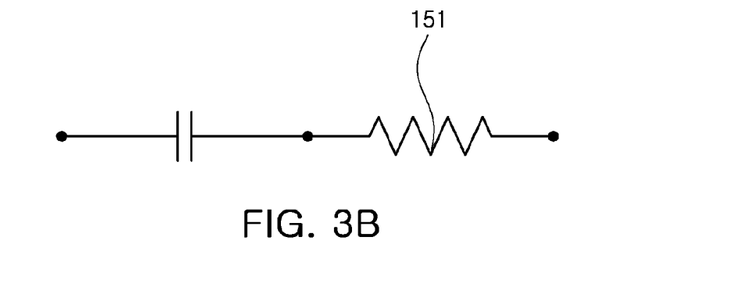

In FIG. 3B illustrating an equivalent circuit of the multilayer ceramic capacitor 100 according to an embodiment in the present disclosure, the resistive pattern may be used as the intermitting part 151.

The resistive pattern may include one of a resistor, a varistor, and a thermistor. However, the present disclosure is not limited thereto.

In the case in which the resistive pattern is used as the intermitting part 151 as shown in FIG. 3B, electricity may be discharged from the multilayer ceramic capacitor 100 for a time determined by a resistance value of the resistive pattern.

Here, the intermitting part 151 may have a resistance as low as possible to significantly suppress an increase in an equivalent series resistance (ESR) value. However, in the present disclosure, a resistance value of the intermitting part 151 is not limited to a specific value.

Generally, in the case in which the multilayer ceramic capacitor 100 having a relatively low ESR value is used as a power supply circuit, oscillation occurs in the power supply circuit due to low ESR characteristics.

Here, when the ESR value of the multilayer ceramic capacitor 100 is increased in order to prevent the occurrence of oscillation, equivalent series inductance (ESL) may be relatively increased, such that electrical characteristics of the multilayer ceramic capacitor 100 may be deteriorated.

In addition, in the case in which short circuits occur in the multilayer ceramic capacitor 100, an over-current may be transferred to remaining circuits connected to the multilayer ceramic capacitor 100 while damaging the entirety of a product connected to the multilayer ceramic capacitor 100.

In the embodiment in the present disclosure, the first and second external electrodes 131 and 132 connected to both end portions of the first internal electrodes 121 may be positive electrodes, and the fourth external electrode 142 may be a negative electrode.

When power is applied to the multilayer ceramic capacitor 100, a current path may move from the first and second external electrodes 131 and 132, which are the positive electrodes, toward central portions of the first internal electrodes 121, may then move to the third external electrode 141 through the capacitance portions 122a and the lead-out portions 122b of the second internal electrodes 122 stacked in the thickness direction, and may then move to the fourth external electrode 142, which is the negative electrode, through the intermitting part 151.

As described above, in the embodiment in the present disclosure, since the current path of the multilayer ceramic capacitor 100 moves from both end surfaces of the ceramic body 110 to a central portion thereof, the ESR value of the multilayer ceramic capacitor 100 may be increased and an increase in the ESL value may be significantly suppressed, such that electrical characteristics of the multilayer ceramic capacitor 100 may be improved.

In addition, the intermitting part 151 connecting the third and fourth external electrodes 141 and 142 to each other may be formed on the second main surface 2 of the ceramic body 110. In the case in which short circuits occur in the multilayer ceramic capacitor 100, the intermitting part 151 may be short-circuited to allow the circuit to be in an open state, thereby preventing over current from being transferred to the remaining circuits connected to the multilayer ceramic capacitor 100 so as to prevent damage to the entirety of a product connected to the multilayer ceramic capacitor 100.

Therefore, in the case in which short circuits occur in the multilayer ceramic capacitor 100, only the multilayer ceramic capacitor 100 in the entirety of a product may be replaced, repaired, and then reused.

Vertical Mounting Type Multilayer Ceramic Capacitor

Figure 4:
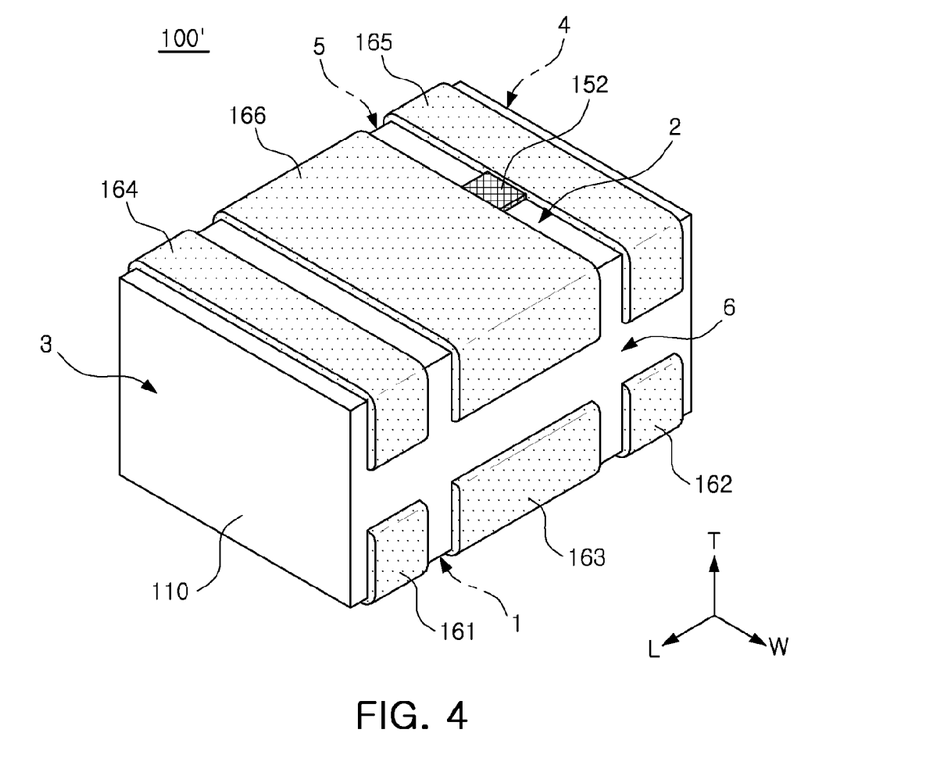
FIG. 4 is a perspective view schematically illustrating a multilayer ceramic capacitor according to another embodiment in the present disclosure.
Figure 5:
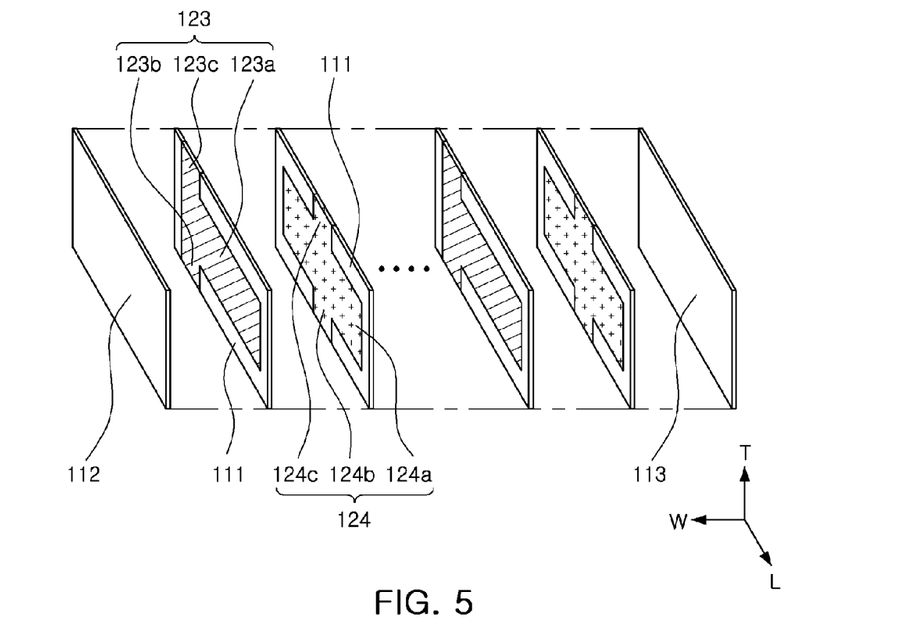
FIG. 5 is an exploded perspective view illustrating a structure in which first and second internal electrodes of the multilayer ceramic capacitor of FIG. 4 are stacked on each other.

FIG. 4 is a perspective view schematically illustrating a multilayer ceramic capacitor according to another embodiment in the present disclosure; and FIG. 5 is an exploded perspective view illustrating a structure in which first and second internal electrodes of the multilayer ceramic capacitor of FIG. 4 are stacked.

Referring to FIGS. 4 and 5, a multilayer ceramic capacitor 100' according to another embodiment in the present disclosure, having a vertical mounting type structure, may include a ceramic body 110, first to third external electrodes 161 to 163 formed on a first main surface 1 of the ceramic body 110 so as to be spaced apart from each other in a length direction of the ceramic body, fourth to sixth external electrodes 164 to 166 disposed on a second main surface 2 of the ceramic body 110 so as to be spaced apart from each other in the length direction and opposing the first to third external electrodes 161 to 163, respectively, a plurality of first and second internal electrodes 123 and 124, and an intermitting part 152.

For example, the multilayer ceramic capacitor 100' according to another embodiment in the present disclosure may be a so-called third-terminal capacitor.

Next, a detailed description for structures similar to those of the multilayer ceramic capacitor according to the foregoing embodiment in the present disclosure described above will be omitted in order to avoid an overlapping description, and a vertical mounting structure different from the structure of the multilayer ceramic capacitor according to the foregoing embodiment in the present disclosure described above will be described in detail.

In addition, for convenience of explanation, for example, internal electrodes will be provided as first and second internal electrodes, and external electrodes will be provided as first to sixth external electrodes. However, these internal electrodes and external electrodes do not necessarily indicate the internal electrodes and the external electrodes having the same configurations as those of the multilayer ceramic capacitor according to the foregoing embodiment in the present disclosure described above.

The ceramic body 110 may be formed by stacking a plurality of dielectric layers 111 to 113 in a width direction and then sintering the plurality of dielectric layers 111 to 113.

In addition, the ceramic body 110 may include an active layer and cover layers 112 and 113.

The active layer contributing to forming capacitance may be apart in which the plurality of internal electrodes are stacked in the ceramic body 110.

The cover layers 112 and 113, which are disposed on sides of the active layer corresponding to the first and second side surfaces 5 and 6 of the ceramic body 110, may be formed using the same material as that of the dielectric layer 111 of the active layer and have the same configuration as that of the dielectric layer 111 of the active layer except that they do not include the internal electrodes.

In addition, the cover layers 112 and 113 may be formed by stacking a single dielectric layer or two or more dielectric layers on the sides of the active layer corresponding to the first and second side surfaces 5 and 6 of the ceramic body in the width direction, respectively.

The plurality of first and second internal electrodes 123 and 124, which have different polarities, may be alternately disposed in the width direction within the ceramic body 110 with each of the dielectric layers 111 interposed therebetween.

Here, the plurality of first and second internal electrodes 123 and 124 may be electrically insulated from each other by the dielectric layers 111 disposed therebetween.

The first internal electrode 123 may include a first capacitance portion 123a overlapped with the second internal electrode 124 to form capacitance and first and second lead-out portions 123b and 123c extended from the first capacitance portion 123a toward the first and second main surfaces 1 and 2 of the ceramic body 110, respectively, so as to be exposed through the first and second main surfaces 1 and 2 of the ceramic body 110, respectively.

The second internal electrode 124 may include a second capacitance portion 124a overlapped with the first capacitance portion 123a of the first internal electrode 123 to form the capacitance and third and fourth lead-out portions 124b and 124c extended from the second capacitance portion 124a toward the first and second main surfaces 1 and 2 of the ceramic body 110, respectively, so as to be exposed through the first and second main surfaces 1 and 2 of the ceramic body 110, respectively, and disposed to be spaced apart from the first and second lead-out portions 123b and 123c, respectively, in the length direction.

Here, a capacitance of the multilayer ceramic capacitor 100' may be in proportion to an area of a region in which the first and second capacitance portions 123a and 124a of the first and second internal electrodes 123 and 124 are overlapped with each other in a thickness direction.

In addition, the first or second internal electrode 123 or 124 may be spaced apart from first and second end surfaces 3 and 4 of the ceramic body 110 in order to improve moisture resistance and prevent cracks, or the like.

The first and second external electrodes 161 and 162 may be disposed on the first main surface 1 of the ceramic body 110 so as to be spaced apart from each other in the length direction, and the first external electrode 161 may be connected to the first lead-out portion 123b of the first internal electrode 123.

The third external electrode 163 may be disposed between the first and second external electrodes 161 and 162 on the first main surface 1 of the ceramic body 110 so as to be spaced apart from the first and second external electrodes 161 and 162 in the length direction, and may be connected to the third lead-out portion 124b of the second internal electrode 124.

The first to third external electrodes 161 to 163 may be extended from the first main surface 1, which is amounting surface of the ceramic body 110, to portions of the first and second side surfaces 5 and 6 of the ceramic body 110 in order to improve sticking strength.

The fourth and fifth external electrodes 164 and 165 may be disposed on the second main surface 2 of the ceramic body 110 so as to be spaced apart from each other in the length direction, and the fourth external electrode 164 may be connected to the second lead-out portion 123c of the first internal electrode 123.

The sixth external electrode 166 may be disposed between the fourth and fifth external electrodes 164 and 165 on the second main surface 2 of the ceramic body 110 so as to be spaced apart from the fourth and fifth external electrodes 164 and 165 in the length direction, and may be connected to the fourth lead-out portion 124c of the second internal electrode 124.

The fourth to sixth external electrodes 164 to 166 may be extended from the second main surface 2, a surface opposing the mounting surface of the ceramic body 110, to portions of the first and second side surfaces 5 and 6 of the ceramic body 110 in order to improve sticking strength.

In the multilayer ceramic capacitor 100' having the electrode structure as described above, since a distance between the first to sixth external electrodes 161 to 166 is relatively small, a current path may be reduced. Therefore, a current loop may be decreased to decrease an ESL value.

The intermitting part 152 may be formed on the second main surface 2, which is the surface opposing the mounting surface of the ceramic body 100, may serve to connect the fifth and sixth external electrodes 165 and 166 to each other on the second main surface 2 of the ceramic body 110.

When a short-circuit phenomenon occurs due to internal short circuits, an electrical overload, or the like, the intermitting part 152 may be short-circuited, opening a circuit. Therefore, the intermitting part 152 may prevent an over-current generated in the multilayer ceramic capacitor 100' from being transferred to remaining circuits connected to the multilayer ceramic capacitor 100' to prevent damage to the entirety of a product.

Here, the intermitting part 152 may be a fuse, a resistive pattern, or the like. However, the present disclosure is not limited thereto.

Figure 6A:
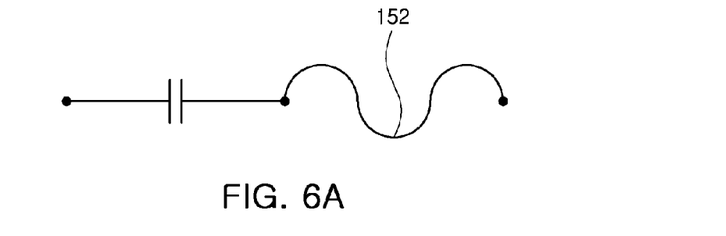
FIGS. 6A and 6B are circuit diagrams illustrating an equivalent circuit of the multilayer ceramic capacitor according to another embodiment in the present disclosure.

In FIG. 6A illustrating an equivalent circuit of the multilayer ceramic capacitor 100' according to another embodiment in the present disclosure, the fuse may be used as the intermitting part 152.

Figure 6B:
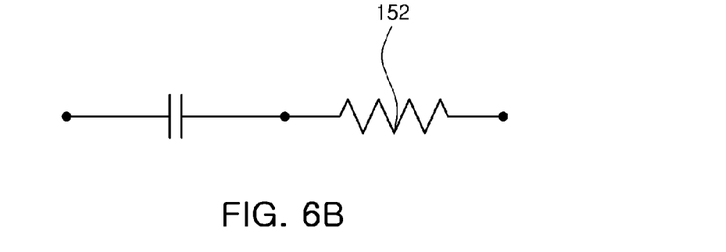

In FIG. 6B illustrating an equivalent circuit of the multilayer ceramic capacitor 100' according to another embodiment in the present disclosure, the resistive pattern may be used as the intermitting part 152.

Therefore, the intermitting part 152 may have resistance as low as possible to significantly suppress an increase in an ESR value. However, in the present disclosure, a resistance value of the intermitting part 152 is not limited to a specific value.

According to the embodiment in the present disclosure, the first internal electrode 123 and the first and fourth external electrodes 161 and 164 may be positive electrodes, and the second internal electrode 124 and the fifth external electrode 165 may be negative electrodes.

When power is applied to the multilayer ceramic capacitor 100', a current path may move from the first and fourth external electrodes 161 and 164, which are the positive electrodes, to the first capacitance portion 123a of the first internal electrode 123 through the first and second lead-out portions 123b and 123c of the first internal electrode 123, may then move to the sixth external electrode 166 through the second capacitance portion 124a and the third and fourth lead-out portions 124b and 124c of the second internal electrode 124, and may then move to the fifth external electrode 165, which is the negative electrode, through the intermitting part 152.

As described above, according to the embodiment in the present disclosure, since the current path of the multilayer ceramic capacitor 100' moves from both end portions of the ceramic body 110 to a central portion thereof, the ESR value of the multilayer ceramic capacitor 100' may be increased and an increase in the ESL value may be significantly suppressed, such that electrical characteristics of the multilayer ceramic capacitor 100 may be improved.

In addition, the intermitting part 152 connecting the fifth and sixth external electrodes 165 and 166 to each other may be formed on the second main surface 2 of the ceramic body 110'. In the case in which short circuits occurs in the multilayer ceramic capacitor 100', the intermitting part 152 may be short-circuited to allow the circuit to be in an open state, thereby preventing an over-current from being transferred to the remaining circuits connected to the multilayer ceramic capacitor 100' so as to prevent damage to the entirety of a product connected to the multilayer ceramic capacitor 100'.

As set forth above, according to embodiments in the present disclosure, since the current path moves from both end surfaces of the ceramic body to the central portion thereof, the ESR value of the multilayer ceramic capacitor may be increased and the increase in the ESL value may be significantly suppressed, such that the electrical characteristics of the multilayer ceramic capacitor may be improved.

In addition, the intermitting part connecting adjacent external electrodes to each other may be formed on the surface of the ceramic body opposing the mounting surface thereof. In the case in which short circuits occur in the multilayer ceramic capacitor, the intermitting part may be short-circuited, opening the circuit, thereby preventing an over-current from being transferred to the remaining circuits connected to the multilayer ceramic capacitor so as to prevent damage to the entirety of a product connected to the multilayer ceramic capacitor.

While exemplary embodiments have been shown and described above, it will be apparent to those skilled in the art that modifications and variations could be made without departing from the scope of the invention as defined by the appended claims.

What is claimed is:

1. A multilayer ceramic capacitor comprising:
a ceramic body having a plurality of dielectric layers stacked in a thickness direction of the ceramic body;
a plurality of first internal electrodes disposed in the ceramic body to be exposed through end surfaces of the ceramic body with a respective dielectric layer interposed between the first internal electrodes;
a plurality of second internal electrodes stacked alternately with the first internal electrodes in the ceramic body and disposed in the ceramic body to be exposed through one side surface of the ceramic body, with a respective dielectric layer interposed between the second internal electrodes;
first and second external electrodes disposed on the end surfaces of the ceramic body, respectively, and connected to end portions of the first internal electrodes, respectively;
a third external electrode extended from one side surface of the ceramic body to a portion of a surface opposing a mounting surface of the ceramic body and connected to the second internal electrodes;
a fourth external electrode extended from the other side surface of the ceramic body to a portion of the surface opposing the mounting surface of the ceramic body; and
an intermitting part disposed on the surface opposing the mounting surface of the ceramic body and connecting the third and fourth external electrodes to each other,
wherein at least one of the first internal electrodes is formed to be exposed through the respective two end surfaces facing each other and is in contact with the first and second external electrodes.

2. The multilayer ceramic capacitor of claim 1, wherein the intermitting part is a fuse.

3. The multilayer ceramic capacitor of claim 1, wherein the intermitting part is a resistive pattern.

4. The multilayer ceramic capacitor of claim 1, wherein the second internal electrode has a lead-out portion to be exposed through one side surface of the ceramic body.

5. The multilayer ceramic capacitor of claim 1, wherein the first and second external electrodes are extended from both end surfaces of the ceramic body to portions of the mounting surface of the ceramic body, respectively.

6. A multilayer ceramic capacitor comprising:
a ceramic body having a plurality of dielectric layers stacked in a width direction of the ceramic body;
first and second external electrodes disposed on a mounting surface of the ceramic body to be spaced apart from each other in a length direction of the ceramic body;
a third external electrode disposed on the mounting surface of the ceramic body and disposed between the first and second external electrodes;
fourth to sixth external electrodes disposed on a surface opposing the mounting surface of the ceramic body to correspond to the first to third external electrodes, respectively;
a plurality of first and second internal electrodes alternately disposed in the ceramic body with a respective dielectric layer interposed between the plurality of first and second internal electrodes;
first and second lead-out portions extended from the first internal electrode to be exposed through the mounting surface of the ceramic body and the surface opposing the mounting surface of the ceramic body, respectively, and connected to the first and fourth external electrodes, respectively;
third and fourth lead-out portions extended from the second internal electrode to be exposed through the mounting surface of the ceramic body and the surface opposing the mounting surface of the ceramic body, respectively, and connected to the third and sixth external electrodes, respectively; and
an intermitting part disposed on the surface opposing the mounting surface of the ceramic body and connecting the fifth and sixth external electrodes to each other,
wherein the fifth external electrode does not directly contact the first and second internal electrodes.

7. The multilayer ceramic capacitor of claim 6, wherein the intermitting part is a fuse.

8. The multilayer ceramic capacitor of claim 6, wherein the intermitting part is a resistive pattern.

9. The multilayer ceramic capacitor of claim 6, wherein the first or second internal electrode is spaced apart from both end surfaces of the ceramic body.

10. The multilayer ceramic capacitor of claim 6, wherein the first to sixth external electrodes are extended from the mounting surface of the ceramic body or the surface opposing the mounting surface of the ceramic body to portions of both side surfaces of the ceramic body, respectively.

* * * * *